(12) United States Patent
Okino

(10) Patent No.: US 12,013,821 B2
(45) Date of Patent: Jun. 18, 2024

(54) INFORMATION PROCESSING APPARATUS AND FILE RECORDING METHOD

(71) Applicant: Sony Interactive Entertainment Inc., Tokyo (JP)

(72) Inventor: Naoto Okino, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 37 days.

(21) Appl. No.: 17/783,331

(22) PCT Filed: Sep. 28, 2020

(86) PCT No.: PCT/JP2020/036716
§ 371 (c)(1),
(2) Date: Jun. 8, 2022

(87) PCT Pub. No.: WO2021/124633
PCT Pub. Date: Jun. 24, 2021

(65) Prior Publication Data
US 2023/0008725 A1    Jan. 12, 2023

(30) Foreign Application Priority Data

Dec. 16, 2019  (JP) .................... 2019-226719

(51) Int. Cl.
*G06F 16/182*  (2019.01)
*G06F 16/16*  (2019.01)

(52) U.S. Cl.
CPC .......... *G06F 16/182* (2019.01); *G06F 16/164* (2019.01)

(58) Field of Classification Search
CPC ................ G06F 16/182; G06F 16/164
USPC ........................................... 707/827
See application file for complete search history.

(56) References Cited

U.S. PATENT DOCUMENTS

| 7,587,433 | B2 |  | 9/2009 | Peleg |
| 7,751,628 | B1 | * | 7/2010 | Reisman ........ H04N 21/440227 382/232 |
| 8,238,203 | B2 | * | 8/2012 | Morohoshi ........ H04N 21/8113 369/30.01 |
| 9,286,059 | B2 |  | 3/2016 | Hatakeyama |
| 9,529,725 | B2 | * | 12/2016 | Hashimoto ............. A63F 13/95 |

(Continued)

FOREIGN PATENT DOCUMENTS

| CN | 103440204 A | 12/2013 |
| JP | 04260945 A | 9/1992 |

(Continued)

OTHER PUBLICATIONS

Jett, Jacob, et al., "A Conceptual Model for Video Games and Interactive Media", Journal of the Association for Information Science and Technology, vol. 67, No. 3, © 2016, pp. 505-517.*

(Continued)

*Primary Examiner* — Robert Stevens
(74) *Attorney, Agent, or Firm* — Matthew B. Dernier, Esq.

(57) ABSTRACT

Before a file logically divided into a plurality of groups is downloaded, an acquisition section acquires meta information set for the groups. An area management section reserves recording areas in a first storage and a second storage according to the meta information of the groups. A recording processing section records the groups into the first storage or the second storage according to the meta information of the groups.

5 Claims, 6 Drawing Sheets

| GROUP ID | RECORDING AREA | DELETION TIMING |
|---|---|---|
| 1 | FIRST STORAGE | DELETE AT DELETION TIMING OF FILE |
| 2 | SECOND STORAGE | INDEPENDENTLY DELETABLE |
| 3 | SECOND STORAGE | DELETE AT DELETION TIMING OF FILE |
| 4 | SECOND STORAGE | DELETE AT DELETION TIMING OF FILE |
| 5 | FIRST STORAGE | INDEPENDENTLY DELETABLE |
| 6 | SECOND STORAGE | DELETE AT DELETION TIMING OF FILE |
| 7 | SECOND STORAGE | DELETE AT DELETION TIMING OF FILE |
| 8 | FIRST STORAGE | INDEPENDENTLY DELETABLE |
| 9 | SECOND STORAGE | INDEPENDENTLY DELETABLE |
| 10 | FIRST STORAGE | DELETE AT DELETION TIMING OF FILE |

(56) References Cited

U.S. PATENT DOCUMENTS

| | | | |
|---|---|---|---|
| 9,678,966 | B2 | 6/2017 | Ki |
| 9,830,345 | B1 | 11/2017 | Baars |
| 10,114,829 | B1 | 10/2018 | Bono |
| 10,146,466 | B1 | 12/2018 | Puhov |
| 10,372,336 | B2 | 8/2019 | Xu |
| 10,482,065 | B1* | 11/2019 | Armangau .......... G06F 16/1748 |
| 10,891,389 | B2 | 1/2021 | Takumi |
| 11,093,452 | B2* | 8/2021 | Lection .............. G06F 16/2365 |
| 2005/0065961 | A1* | 3/2005 | Aguren ................. G06F 16/10 |
| | | | 707/999.102 |
| 2006/0004756 | A1 | 1/2006 | Peleg |
| 2008/0082590 | A1 | 4/2008 | Hamilton |
| 2009/0067819 | A1* | 3/2009 | Tanaka ................ G06F 12/0246 |
| | | | 386/326 |
| 2011/0245947 | A1* | 10/2011 | Morohoshi ........ H04N 21/6125 |
| | | | 700/94 |
| 2012/0257872 | A1* | 10/2012 | Toyoda .............. H04N 21/6582 |
| | | | 386/E5.028 |
| 2014/0201209 | A1* | 7/2014 | Hashimoto ............. A63F 13/95 |
| | | | 707/737 |
| 2015/0126283 | A1 | 5/2015 | Okino |
| 2015/0126284 | A1* | 5/2015 | Okino .................... A63F 13/35 |
| | | | 463/42 |
| 2015/0126288 | A1* | 5/2015 | Okino .............. G11B 20/10527 |
| | | | 463/43 |
| 2015/0127692 | A1* | 5/2015 | Okino ................ G06F 16/1724 |
| | | | 707/824 |
| 2015/0134621 | A1 | 5/2015 | Ki |
| 2015/0235028 | A1 | 8/2015 | Tsuchitoi |
| 2015/0301823 | A1 | 10/2015 | Hatakeyama |
| 2016/0063018 | A1 | 3/2016 | Das |
| 2016/0179502 | A1 | 6/2016 | Cawley |
| 2017/0199817 | A1 | 7/2017 | Ishihara |
| 2017/0235499 | A1 | 8/2017 | Xu |
| 2018/0011649 | A1* | 1/2018 | Hashimoto ........... G06F 11/008 |
| 2018/0081894 | A1* | 3/2018 | Wang ................ G06F 16/24544 |
| 2019/0286833 | A1 | 9/2019 | Takumi |
| 2020/0319816 | A1 | 10/2020 | Li |
| 2021/0019164 | A1 | 1/2021 | Choudhary |

FOREIGN PATENT DOCUMENTS

| | | | | |
|---|---|---|---|---|
| JP | 2000215201 | A | 8/2000 | |
| JP | 2008501180 | A | 1/2008 | |
| JP | 2008123104 | A | 5/2008 | |
| JP | 2010515163 | A | 5/2010 | |
| JP | 2015088144 | A | 5/2015 | |
| JP | 2015095262 | A | 5/2015 | |
| JP | 2015207145 | A | 11/2015 | |
| JP | 2017123110 | A | 7/2017 | |
| JP | 2019091477 | A | 6/2019 | |
| JP | 2019114076 | A | 7/2019 | |
| JP | 2019159830 | A | 9/2019 | |
| JP | 2019164705 | A | 9/2019 | |
| KR | 20170075009 | A | 6/2017 | |
| WO | 2008083001 | A1 | 7/2008 | |
| WO | WO 2014/111984 | A1 * | 7/2014 | .............. G06F 9/54 |
| WO | 2015039028 | A1 | 3/2015 | |
| WO | 2021036848 | A1 | 3/2021 | |

OTHER PUBLICATIONS

Vaniea, Kami, et al., "Tales of Software Updates: The process of updating software", CHI '16, San Jose, CA, May 7-16, 2016, pp. 3215-3226.*

Microsoft Computer Dictionary, 5th Edition, Microsoft Press, Redmond, WA, © 2002, p. 211.*

"SMPTE Standard: Media Package for Storage, Distribution and Playback of Multimedia File Sets and Internet Resources", SMPTE ST 2053:2011, © 2011, The Society of Motion Picture and Television Engineers, 39 pages.*

Decision to Grant a Patent for related JP Application No. 2019-226720, 6 pages, dated Jun. 27, 2023.

International Search Report for corresponding PCT APplication No. PCT/JP2020/036716, 4 pages, dated Nov. 2, 2020.

Notice of Reasons for Refusal for related JP Application No. 2019-226718, 6 pages, dated Mar. 30, 2023.

International Search Report for corresponding PCT Application No. PCT/JP2020/036718, 4 pages, dated Dec. 15, 2020.

International Search Report for corresponding PCT Application No. PCT/JP2020/036717, 4 pages, dated Dec. 1, 2020.

* cited by examiner

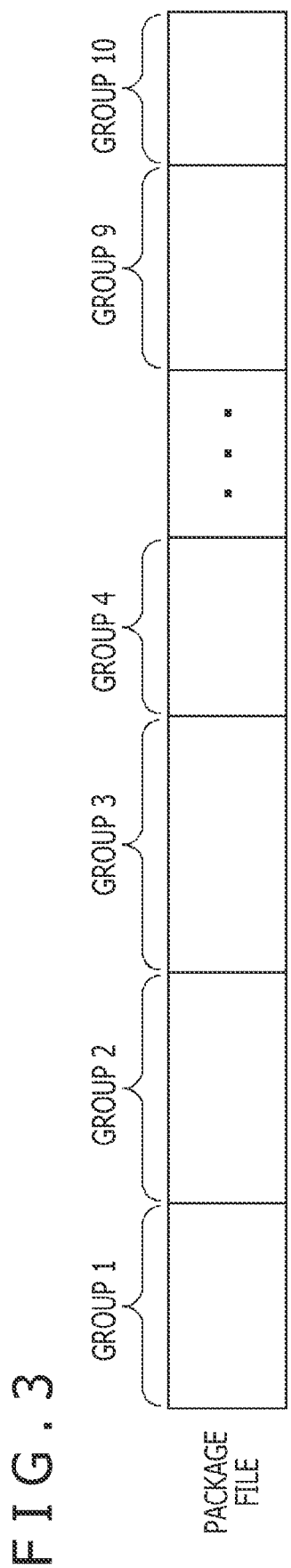
F I G. 3

FIG.4

| GROUP ID | RECORDING AREA | DELETION TIMING |
|---|---|---|
| 1 | FIRST STORAGE | DELETE AT DELETION TIMING OF FILE |
| 2 | SECOND STORAGE | INDEPENDENTLY DELETABLE |
| 3 | SECOND STORAGE | DELETE AT DELETION TIMING OF FILE |
| 4 | SECOND STORAGE | DELETE AT DELETION TIMING OF FILE |
| 5 | FIRST STORAGE | INDEPENDENTLY DELETABLE |
| 6 | SECOND STORAGE | DELETE AT DELETION TIMING OF FILE |
| 7 | SECOND STORAGE | DELETE AT DELETION TIMING OF FILE |
| 8 | FIRST STORAGE | INDEPENDENTLY DELETABLE |
| 9 | SECOND STORAGE | INDEPENDENTLY DELETABLE |
| 10 | FIRST STORAGE | DELETE AT DELETION TIMING OF FILE |

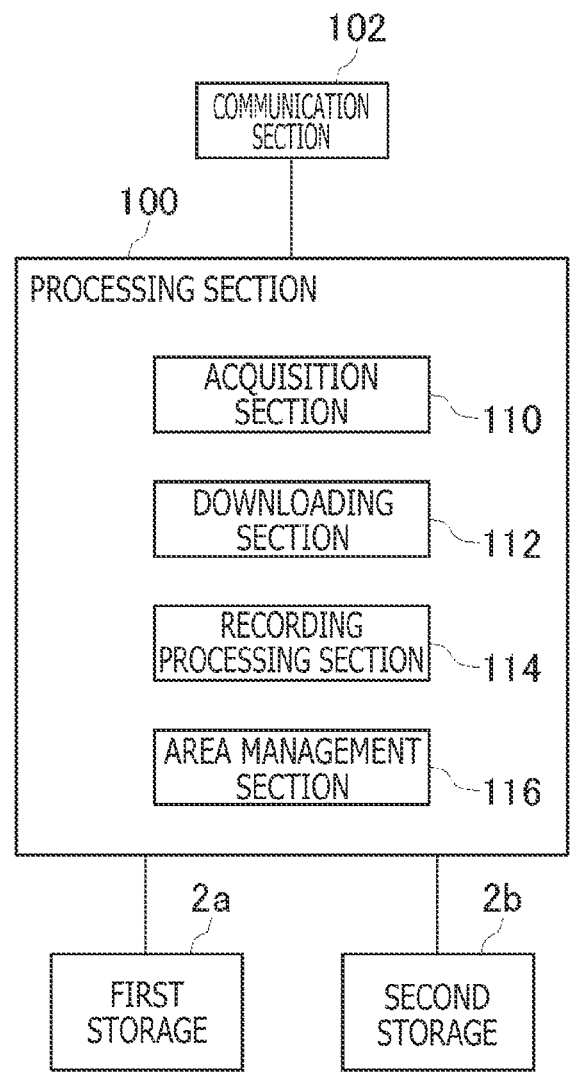

INFORMATION PROCESSING APPARATUS AND FILE RECORDING METHOD

TECHNICAL FIELD

The present invention relates to a technology for recording a file into a storage.

BACKGROUND ART

Conventionally, game software has been circulated and sold in the form of a read only memory (ROM) medium such as an optical disk, a magneto-optical disk, or a Blu-ray disk. Together with increase of the speed of data communication, it has recently become common that a content server transmits a package file of a game to a game device over the Internet.

SUMMARY

Technical Problem

Game software includes a file group for executing a game including a boot file, a game program, and so forth, another file group that is used by an operating system (OS) of a game device, and so forth. In a case where a game device is connected to a plurality of kinds of storages that are different in characteristic from each other, it is preferable, for the purpose of file management, to record each file into an appropriate one of the storages.

Therefore, it is an object of the present invention to provide a technology for recording a file appropriately into a storage.

Solution to Problem

In order to solve the subject described above, the information processing apparatus according to a certain mode of the present invention is an information processing apparatus in which a file logically divided into a plurality of groups is recorded into a first storage or a second storage, each of the groups having meta information set therefor, the information processing apparatus including an acquisition section that acquires meta information of a group and a recording processing section that records the group whose meta information is acquired into the first storage or the second storage according to the acquired meta information of the group.

Another mode of the present invention is a file recording method for recording a file logically divided into a plurality of groups into a first storage or a second storage, each of the groups having meta information set therefor, the file recording method including a step of acquiring meta information of a group and a step of recording the group whose meta information is acquired into the first storage or the second storage according to the acquired meta information of the group.

It is to be noted that any combination of the constituent elements described above and representations of the present invention converted between a method, a device, a system, a recording medium, a computer program, and so forth are also effective as modes of the present invention.

BRIEF DESCRIPTION OF DRAWINGS

FIG. 3 is a view depicting an example of a package file divided into a plurality of groups.

FIG. 4 is a view depicting an example of meta information for allocation.

FIG. 5 is a view depicting functional blocks of the information processing apparatus.

DESCRIPTION OF EMBODIMENT

Figure 1:
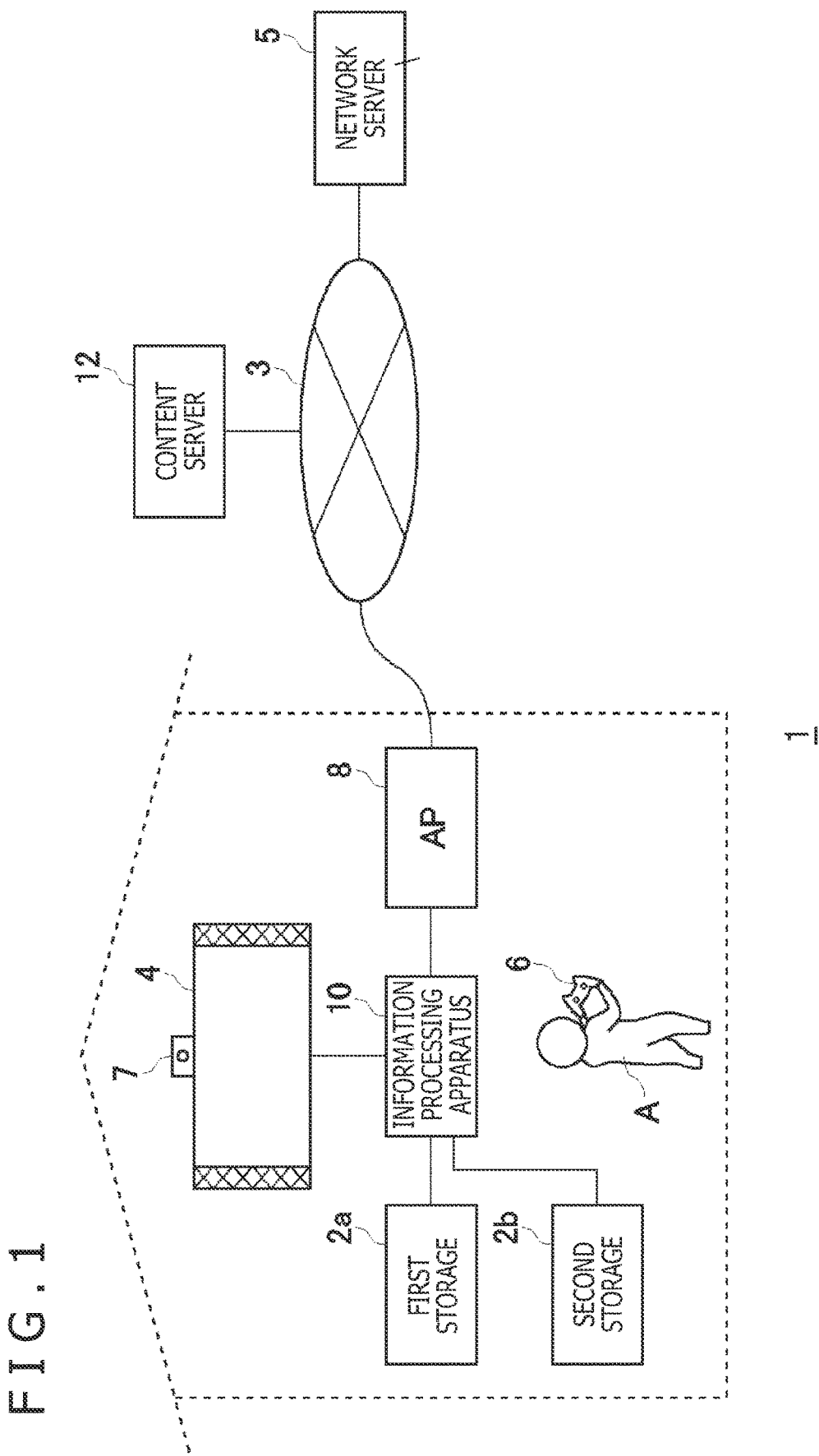
FIG. 1 is a view depicting an information processing system according to a working example.

FIG. 1 depicts an information processing system 1 according to a working example of the present invention. The information processing system 1 includes an information processing apparatus 10, a network server 5, and a content server 12 that transmits digital content. An access point (hereinafter referred to as an "AP") 8 has functions of a wireless access point and a router, and the information processing apparatus 10 connects for communication to the network server 5 and the content server 12 on a network 3 via the AP 8. The network 3 may be configured from the Internet, a local area network (LAN), or the like.

The network server 5 is maintained and managed by an operating entity of the information processing system 1 and provides a network service to a user of the information processing system 1. The content server 12 retains digital content such as game software and video files and delivers digital content in response to a request from a user. The user can download digital content from the content server 12 and can record saved data and so forth of a game into the network server 5 by signing in to the network service.

The information processing apparatus 10 connects to an inputting device 6 operated by a user, by wireless connection or wired connection, and the inputting device 6 outputs operation information indicative of a result of operation made thereon by the user to the information processing apparatus 10. After the information processing apparatus 10 accepts the operation information from the inputting device 6, it reflects the operation information on processing of the OS and an application and causes an outputting device 4 to output a result of the processing. In the working example, the information processing apparatus 10 may be a game device that executes a game program, and the inputting device 6 may be such equipment as a game controller that supplies, to the information processing apparatus 10, information regarding an operation made by the user. The information processing apparatus 10 may include not only a game execution function but also a function of reproducing video such as a movie.

The outputting device 4 may be a television set that includes a display that outputs an image and a speaker that outputs sound, or may be a head-mounted display. A camera 7 is provided in the proximity of the outputting device 4 and captures an image of a space around the outputting device 4. A first storage 2a and a second storage 2b are auxiliary storage devices such as a hard disk drive (HDD) or a solid-state drive (SSD). Although the first storage 2a and the second storage 2b may be storage devices different from each other, they may otherwise be recording areas to which recording characteristics different from each other are set in the same storage device. For example, among a plurality of blocks of an SSD, some may be the first storage 2a and others may be second storage 2b. In a case where the first storage 2a and the second storage 2b are not particularly distinguished from each other, each of them is sometimes referred to as a "storage 2."

In the working example, the first storage 2a has a recording area for random access, and the second storage 2b has a recording area for sequential access. Therefore, preferably, a file that is suitable to be accessed at random is recorded into the first storage 2a, and a file that is suitable to be accessed sequentially is recorded into the second storage 2b.

Both the first storage 2a and the second storage 2b may be configured from a flash memory. In this instance, the recording area of the second storage 2b is divided into a plurality of blocks that serve as erase units and each of which includes a plurality of pages that serve as write units. The size of the blocks may be set, for example, to several hundred MB to several GB.

Figure 2:
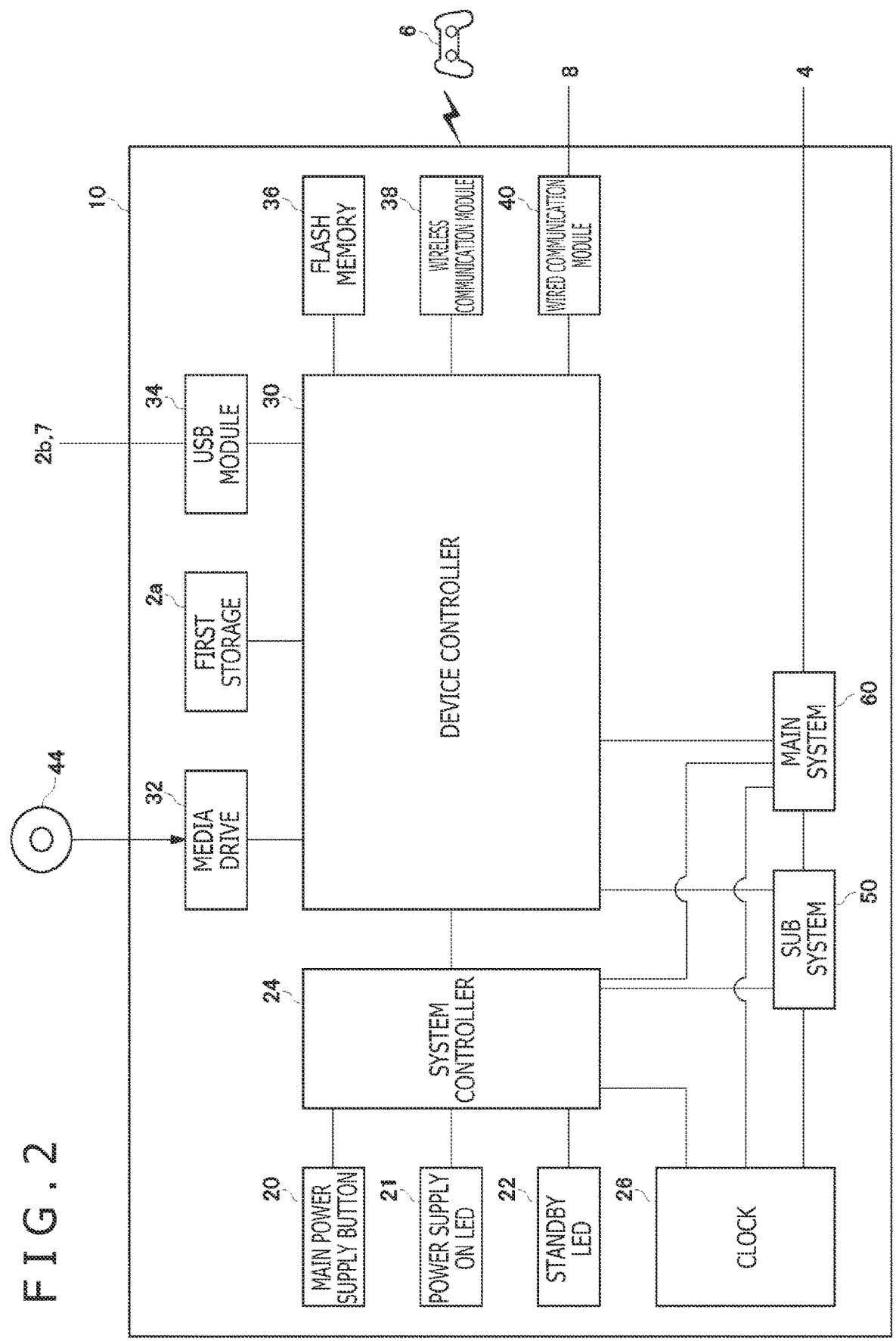
FIG. 2 is a view depicting a hardware configuration of an information processing apparatus.

FIG. 2 depicts a hardware configuration of the information processing apparatus 10. The information processing apparatus 10 includes a main power supply button 20, a power supply ON light emitting diode (LED) 21, a standby LED 22, a system controller 24, a clock 26, a device controller 30, a media drive 32, the first storage 2a, the second storage 2b, a universal serial bus (USB) module 34, a flash memory 36, a wireless communication module 38, a wired communication module 40, a sub system 50, and a main system 60.

The main system 60 includes a main central processing unit (CPU), a memory and a memory controller that are a main storage device, a graphics processing unit (GPU), and so forth. The GPU is used principally for arithmetic processing of a game program. The functions mentioned may be configured as a system-on-chip and formed on one chip. The main CPU has a function of executing game software stored in the first storage 2a or the second storage 2b.

The sub system 50 includes a sub CPU, a memory and a memory controller that are a main storage device, and so forth, but does not include a GPU nor does it have a function for executing a game program. The circuit gate number of the sub CPU is smaller than the circuit gate number of the main CPU, and the operating power consumption of the sub CPU is lower than the operating power consumption of the main CPU.

The main power supply button 20 is a button by which operation input from a user is performed; the main power supply button 20 is provided on a front face of a housing of the information processing apparatus 10 and is operated to turn on or off the power supply to the main system 60 of the information processing apparatus 10. The power supply ON LED 21 is lit when the main power supply button 20 is turned on, and the standby LED 22 is lit when the main power supply button 20 is turned off.

The system controller 24 detects depression of the main power supply button 20 by a user. When the main power supply button 20 is depressed with the main power supply in an off state, then the system controller 24 acquires the depression operation as an "on command," and when the main power supply button 20 is depressed with the main power supply in an on state, then the system controller 24 acquires the depression operation as an "off command."

The clock 26 is a real time clock, and generates and supplies current date and time information to the system controller 24, the sub system 50, and the main system 60.

The device controller 30 is configured as a large-scale integrated circuit (LSI) that executes transfer of information between devices like a southbridge. As depicted in FIG. 2, to the device controller 30, such devices as the system controller 24, the media drive 32, the first storage 2a, the USB module 34, the flash memory 36, the wireless communication module 38, the wired communication module 40, the sub system 50, and the main system 60 are connected. The device controller 30 absorbs a difference in electric characteristics and data transfer rate among the devices and controls timings for data transfer.

The media drive 32 is a drive device that accepts and drives a ROM medium 44 in or on which application software of a game or the like is recorded, to read out a program, data, and so forth from the ROM medium 44. The ROM medium 44 is a read-only recording medium such as an optical disk, a magneto-optical disk or a Blu-ray disk.

The USB module 34 is a module for establishing connection to external equipment through a USB cable. The USB module 34 may be connected to the second storage 2b and the camera 7 by a USB cable. The flash memory 36 is an auxiliary storage device that configures an internal storage. The wireless communication module 38 performs, for example, wireless communication with the inputting device 6 by a communication protocol such as the Bluetooth (registered trademark) protocol or the Institute of Electrical and Electronics Engineers (IEEE) 80.11 protocol. It is to be noted that the wireless communication module 38 may be compatible with a digital mobile telephone system. The wired communication module 40 communicates with external equipment by wired communication and connects to the network 3 via the AP 8.

Although, in the hardware configuration depicted in FIG. 2, the first storage 2a is a built-in auxiliary storage device and the second storage 2b is an external auxiliary storage device, both the first storage 2a and the second storage 2b may be a built-in auxiliary storage device. Alternatively, the first storage 2a and the second storage 2b may be recording areas into which one storage device is logically divided and to which different recording characteristics are set.

Described with reference to FIG. 1 again, the content server 12 provides a game purchase screen to a user. If the user purchases a game on the game purchase screen, then the content server 12 transmits a package file of the game to the information processing apparatus 10. The game software includes a file group that is necessary for progress of the game such as a boot file and a game program, another file group that is used by the OS, and so forth.

For example, in a case where a single player mode for playing by one person and a multiplayer mode for playing by a plurality of persons are provided for a game, the game software is configured such that installing a game file for one of the play modes into the storage 2 enables execution of the game in that play mode. This can eliminate the necessity to record, into the storage 2, a game file of the play mode in which the user does not play the game. Conversely, in a state in which game files of both play modes are installed in the storage 2, the user can delete, from the storage 2, the game file of the play mode in which the user no longer plays the game.

FIG. 3 depicts an example of a package file that is divided into a plurality of groups. A package file includes a plurality of game files that configure game software. Although, in this example, the package file is logically divided into ten groups, it may otherwise be divided into any number of groups other than ten. Each group includes one or more game files having the same deletion timing. In each group, meta information for allocation to a storage is set.

FIG. 4 depicts an example of meta information for allocation of a group. The meta information includes at least "recording area" and "deletion timing." It is to be noted that the meta information may further include a write attribute.

The "recording area" is information for specifying a storage into which a group is to be recorded.

Indicated by "first storage" is that the group is to be recorded into the first storage 2a, and indicated by "second storage" is that the group is to be recorded into the second storage 2b. Although, in the working example, only the first storage 2a and the second storage 2b are depicted, a storage or storages having a different recording characteristic or characteristics may be present.

The "deletion timing" is information indicative of a deletion timing of the group. Indicated by "delete at deletion timing of file" is that the group is deleted at a timing when the package file is deleted. In short, the "delete at deletion timing of file" indicates that the deletion timing of the group is always the deletion timing of the package. Accordingly, for a group that must not be deleted from the storage 2 until the package file is deleted, the meta information of the "delete at deletion timing of file" is set.

Indicated by "independently deletable" is that, before the timing at which the package file is deleted, the group can be designated and deleted. It is to be noted that, at the timing when the package file is deleted, the group is also naturally deleted.

Suppose a case in which game files of the single player mode and the multiplayer mode are installed in the storage. If the user has no plan to play the game in the multiplayer mode in the future, the user would like to have the game file of the multi play mode be deleted from the storage 2. Therefore, for a group to which the game file relating to the play mode belongs, it is desirable that the meta information of the "independently deletable" be set. It is to be noted that, not only for a group including a game file for a play mode but also for a group including a language file that can be selected by the user, preferably the meta information of "independently deletable" is set.

FIG. 5 depicts functional blocks of the information processing apparatus 10. The information processing apparatus 10 includes a processing section 100 and a communication section 102. The processing section 100 includes an acquisition section 110, a downloading section 112, a recording processing section 114, and an area management section 116. The communication section 102 is represented as a configuration that includes both the functions of the wireless communication module 38 and the wired communication module 40 depicted in FIG. 2.

Although the configuration of the processing section 100 is implemented, in terms of hardware components, by a CPU, a memory, a program loaded in the memory, a storage, and so forth of any computer, functional blocks implemented by cooperation of them are depicted here in FIG. 5. Accordingly, it is recognized by those skilled in the art that the functional blocks mentioned can be implemented in various forms, i.e., only from hardware, only from software, or from a combination of the two.

Prior to downloading of a package file of a game, the acquisition section 110 acquires meta information of groups of the package file and data sizes of the groups from the content server 12. As depicted in FIG. 4, the meta information of each group includes information indicative of a "storage area" and information indicative of a "deletion timing." The area management section 116 refers to the meta information and the data sizes of the groups to reserve free areas of the first storage 2a and the second storage 2b. The area management section 116 refers to the meta information depicted in FIG. 4 to reserve a free space for a data size of the groups 1, 5, 8, and 10 on the first storage 2a and reserve a free space for a data size of the groups 2, 3, 4, 6, 7, and 9 on the second storage 2b.

After the free areas are reserved, the downloading section 112 downloads the package file from the content server 12, and the recording processing section 114 records, according to the meta information of the downloaded groups, the groups into the reserved area of the first storage 2a or the second storage 2b. In the working example, the recording processing section 114 records the game file of the groups 1, 5, 8, and 10 into the first storage 2a and records the game file of the groups 2, 3, 4, 6, 7, and 9 into the second storage 2b.

In a case where the second storage 2b permits only sequential write and a block set to several hundred MB to several GB is determined to be an erasure unit as described hereinabove, the recording processing section 114 classifies and manages the blocks of the second storage 2b into and as three types in order to enhance the efficiency of garbage collection. In particular, the recording processing section 114 records one or more groups having the same deletion timing into one block such that it can collectively release the blocks at an appropriate timing.

(1) First Dedicated Block

The first dedicated block is a block to be deleted simultaneously with deletion of the file.

Described with reference to FIG. 4, of groups having the meta information of the "second storage 2b," each group having the meta information of the "delete at deletion timing of file" is recorded into the first dedicated block. Since a group having the meta information of the "delete at deletion timing of file" is always deleted at the deletion timing of the (package) file, even if a plurality of groups are recorded in the same first dedicated block, they can be deleted collectively at the time of file deletion.

(2) Second Dedicated Block

The second dedicated block is a block to be deleted when a group to be deleted is designated.

Described with reference to FIG. 4, of groups having the meta information of the "second storage 2b," each group having the meta information of the "independently deletable" is recorded into the second dedicated block. Since a group having the meta information of the "independently deletable" is sometimes deleted independently before deletion of the file, if the size of the group is greater than the block size, then part of the group is recorded into the second dedicated block.

It is to be noted that, since groups having the meta information of the "independently deletable" are different in deletion timing among them, only one group is recorded into the second dedicated block.

(3) Common Block

All or some of game files that are not recorded into any of the first dedicated block and the second dedicated block are recorded into the common block.

Figure 6:
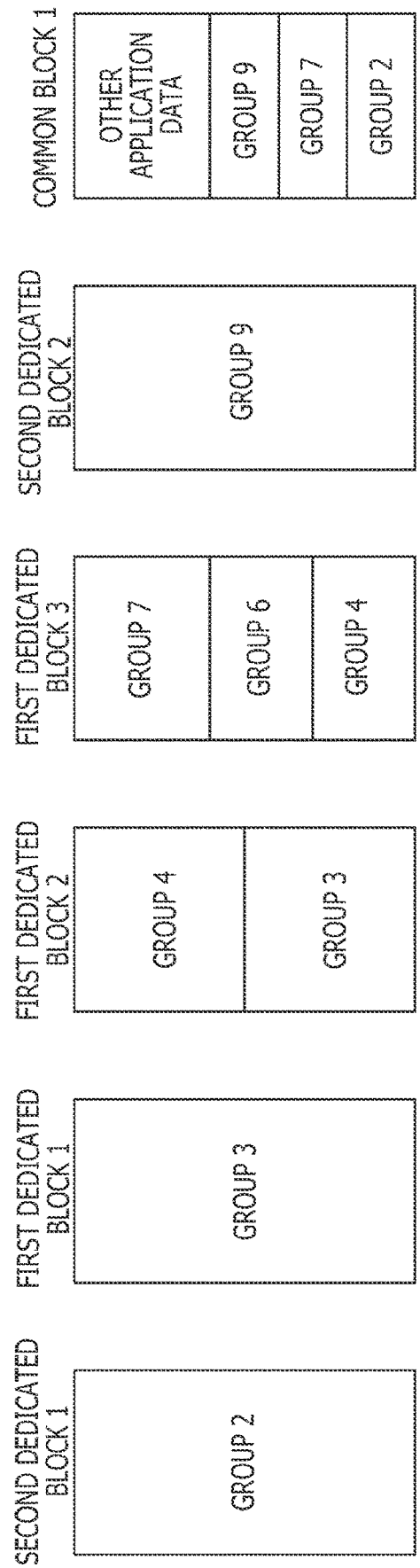
FIG. 6 is a view depicting an example of allocation in a second storage.

FIG. 6 depicts an example of allocation in the second storage 2b. Described with reference to FIG. 4, groups having meta information whose recording destination is the "second storage" are the groups 2, 3, 4, 6, 7, and 9, and the recording processing section 114 records the groups into the blocks of the second storage 2b according to the meta information of the "deletion timing" of the groups.

Into the second dedicated block 1, the group 2 for which the meta information of the "independently deletable" is set is recorded. Data of the group 2 exceeding the block size is recorded in the common block 1. By such recording as just described, there is an advantage that, in a case where a deletion command of the group 2 is input by the user, it is only necessary for the recording processing section 114 to erase the second dedicated block 1 without any change while it is unnecessary to perform garbage collection for the second dedicated block 1.

Into the second dedicated block 2, the group 9 for which the meta information of the "independently deletable" is set is recorded. Data of the group 9 exceeding the block size is recorded in the common block 1. By such recording as just described, there is an advantage that, in a case where a deletion command of the group 9 is input by the user, it is only necessary for the recording processing section 114 to erase the second dedicated block 2 without any change while it is unnecessary to perform garbage collection for the second dedicated block 2.

Into the first dedicated blocks 1 to 3, the groups 3, 4, 6, and 7 for which the meta information of the "delete at deletion timing of file" is set are recorded. Since the deletion timings of the groups are all the same, a plurality of groups may be present in a mixed manner in one block. The recording processing section 114 records a plurality of groups whose group deletion timings are the same as each other into one first dedicated block in this manner. By such recording as just described, there is an advantage that, when the package file is to be deleted, it is only necessary for the recording processing section 114 to erase the first dedicated blocks 1 to 3 without any change while it is unnecessary to perform garbage collection for the first dedicated blocks 1 to 3.

The present invention has been described in reference to the working example. This working example is exemplary, and it is recognized by those skilled in the art that various modifications are possible in regard to combinations of the components and the processes of the working example and that also such modifications fall within the scope of the present invention. Although the working example is described in connection with a package file of a game, the advantages of the present invention can also similarly be obtained from files of different types of applications.

INDUSTRIAL APPLICABILITY

The present invention can be used in a technical field in which a file is recorded into a storage.

REFERENCE SIGNS LIST

1: Information processing system
2a: First storage
2b: Second storage
10: Information processing apparatus
100: Processing section
102: Communication section
110: Acquisition section
112: Downloading section
114: Recording processing section
116: Area management section

The invention claimed is:

1. An information processing apparatus in which a file logically divided into a plurality of groups is recorded into a first storage or a second storage, each of the groups having meta information set therefor, the information processing apparatus comprising:
   an acquisition section that acquires meta information of a group; and
   a recording processing section that records the group whose meta information is acquired into the first storage or the second storage according to the acquired meta information of the group, wherein:
   the meta information includes information that indicates a deletion timing of the group,
   at least one of the first storage or the second storage is divided into a plurality of blocks that serve as erasure units, and
   the recording processing section records a plurality of blocks whose group deletion timings are same as each other into one block.

2. The information processing apparatus according to claim 1, wherein the meta information includes information for specifying a storage into which the meta information is to be recorded.

3. The information processing apparatus according to claim 1, wherein the information that indicates a deletion timing includes information indicating that the timing of deletion of the group is a timing of deletion of the file.

4. A file recording method for recording a file logically divided into a plurality of groups into a first storage or a second storage, each of the groups having meta information set therefor, the file recording method comprising:
   acquiring meta information of a group; and
   recording the group whose meta information is acquired into the first storage or the second storage according to the acquired meta information of the group, wherein:
   the meta information includes information that indicates a deletion timing of the group,
   at least one of the first storage or the second storage is divided into a plurality of blocks that serve as erasure units, and
   the recording includes recording a plurality of blocks whose group deletion timings are same as each other into one block.

5. A non-transitory, computer readable storage medium containing a computer program, which when executed by a computer that has a function of recording a file logically divided into a plurality of groups into a first storage or a second storage, causes the computer to perform a file recording method by carrying out actions, comprising:
   acquiring meta information of a group; and
   recording the group whose meta information is acquired into the first storage or the second storage according to the acquired meta information of the group, wherein:
   the meta information includes information that indicates a deletion timing of the group,
   at least one of the first storage or the second storage is divided into a plurality of blocks that serve as erasure units, and
   the recording includes recording a plurality of blocks whose group deletion timings are same as each other into one block.

* * * * *